United States Patent [19]

Geyer et al.

[11] Patent Number: 4,943,015

[45] Date of Patent: Jul. 24, 1990

[54] FIXING SYSTEM ENABLING A STRUCTURE TO BE RAPIDLY DOCKED FOR SECURING THEREON AN ELEMENT IN A DETACHABLE WAY

[75] Inventors: Freddy Geyer, Cannes La Bocca; Jean P. Henry, Vallauris; Paul Libert, Les Adrets De L'Esterel, all of France

[73] Assignee: Aerospatiale Societe Nationale Industrielle, Paris, France

[21] Appl. No.: 388,009

[22] Filed: Aug. 1, 1989

[30] Foreign Application Priority Data

Aug. 5, 1988 [FR] France ................. 88 10630

[51] Int. Cl.$^5$ ............................ B64G 1/64; B64G 4/00
[52] U.S. Cl. ................................. 244/161; 244/158 R
[58] Field of Search .................. 244/158 R, 159, 161; 269/254 R, 254 CS, 126, 229, 230; 292/256–258; 52/125.2, 127.2, 127.7, 127.8, 584

[56] References Cited

U.S. PATENT DOCUMENTS

| 2,422,727 | 1/1951 | Scheifele ............................. 403/374 |
| 4,185,811 | 1/1980 | Long ....................................... 269/6 |
| 4,473,312 | 9/1984 | Förschner ......................... 292/257 X |
| 4,682,804 | 7/1987 | Palmer et al. ..................... 294/82.26 |

FOREIGN PATENT DOCUMENTS

| 385287 | 3/1931 | United Kingdom ................ 269/229 |
| 820224 | 9/1959 | United Kingdom . |

Primary Examiner—Joseph F. Peters, Jr.
Assistant Examiner—James M. Kannofsky
Attorney, Agent, or Firm—Fisher, Christen & Sabol

[57] ABSTRACT

Fixing system enabling in particular a structure (10) to be rapidly docked for securing thereon an element in a detachable way.

According to the invention, this system is notable in that it comprises:

pliers (3) able to be spontaneously opened under the action of a first spring (7);

a rod (14) able to slide under the action of a second spring (13) so as to close said pliers against the action of said first spring (7);

a mobile support (15) for said second spring (13);

locks (19, 20, 21) able to be controlled for locking said sliding rod (14) and said mobile support (15);

and a pin (23) to control at will the blocking of said locking means.

The system is used for the fixing of an element onto a structure in difficult conditions, for example outside a spaceship.

10 Claims, 8 Drawing Sheets

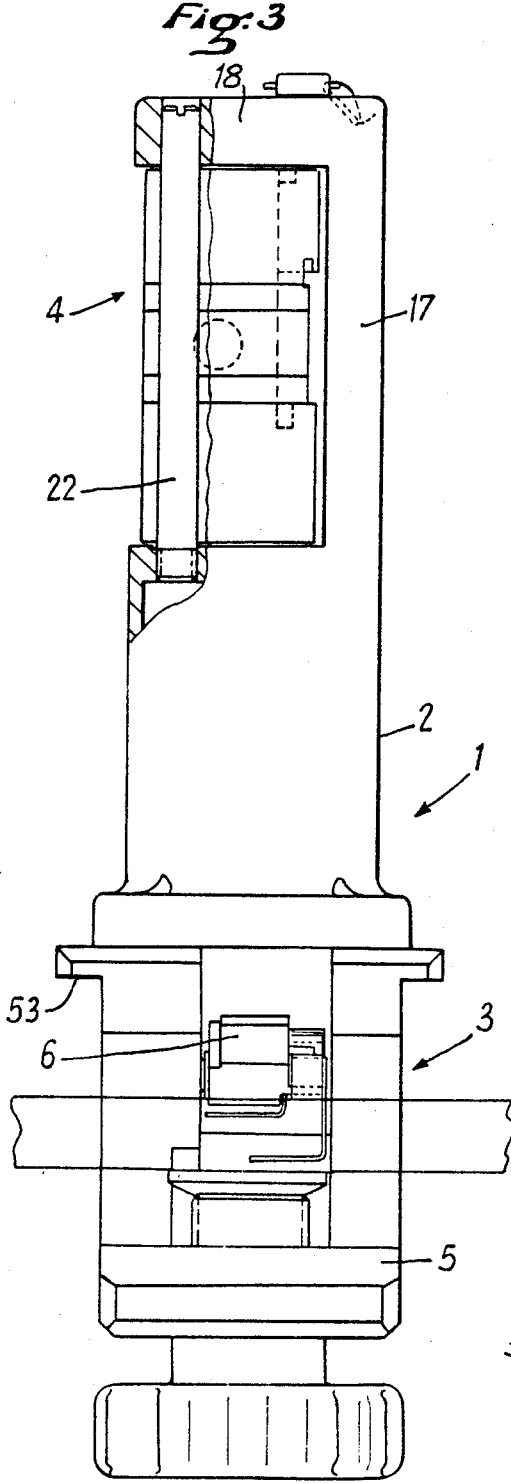
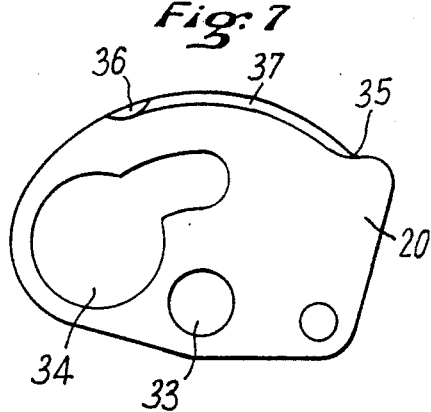
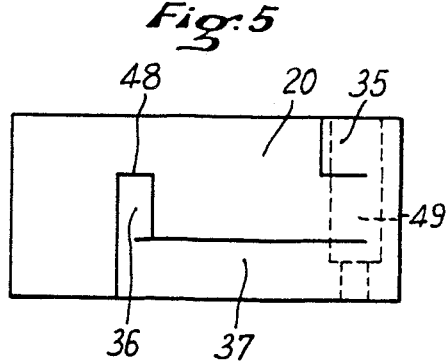
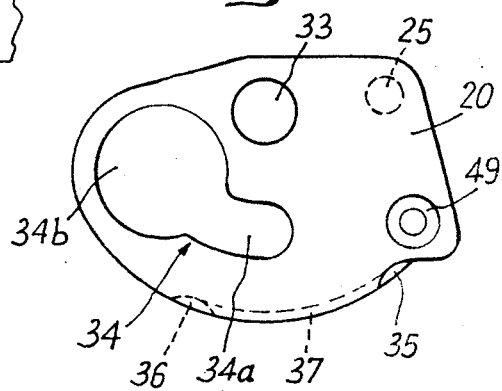

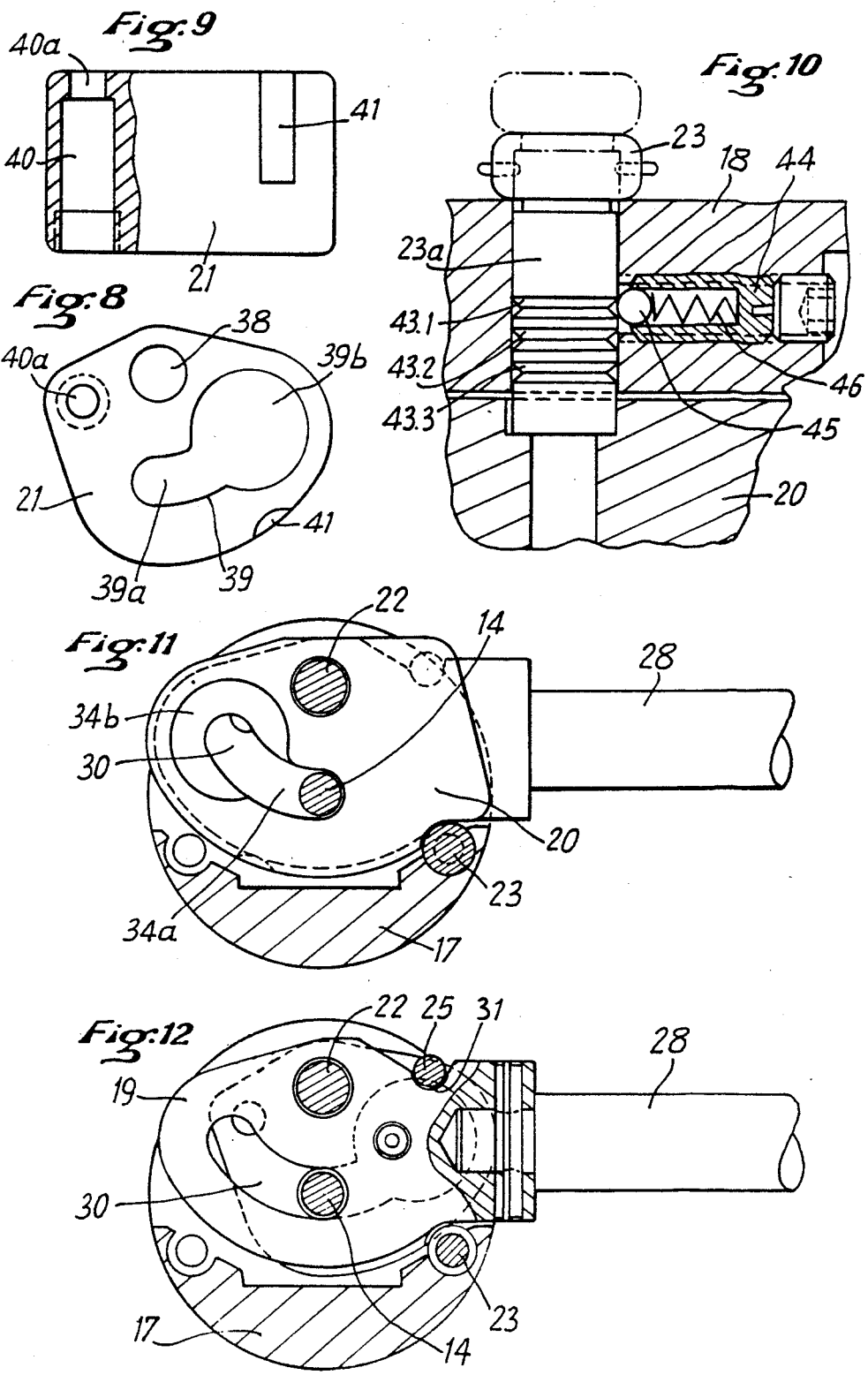

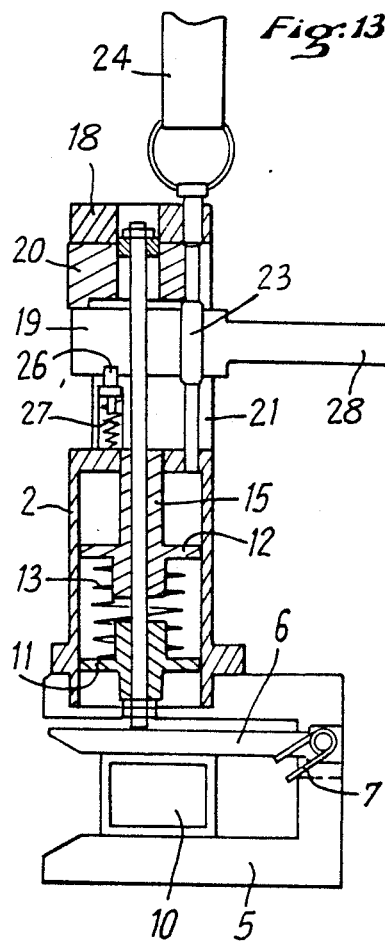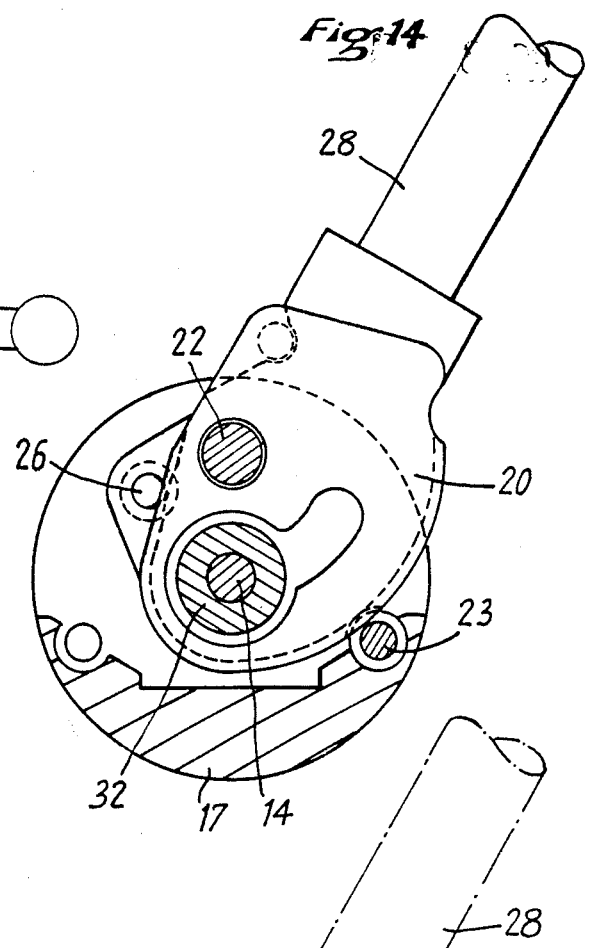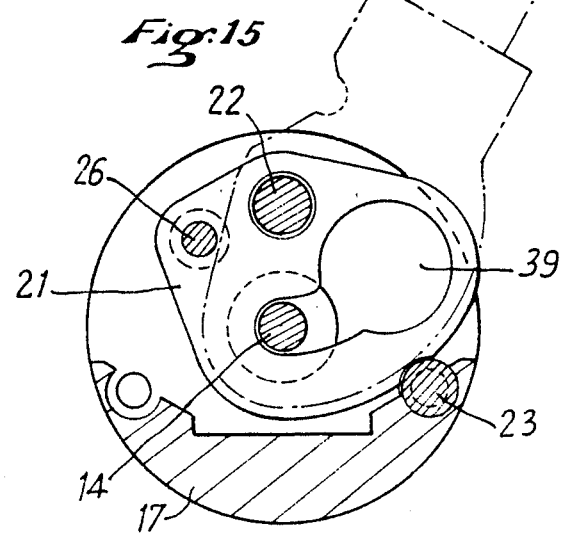

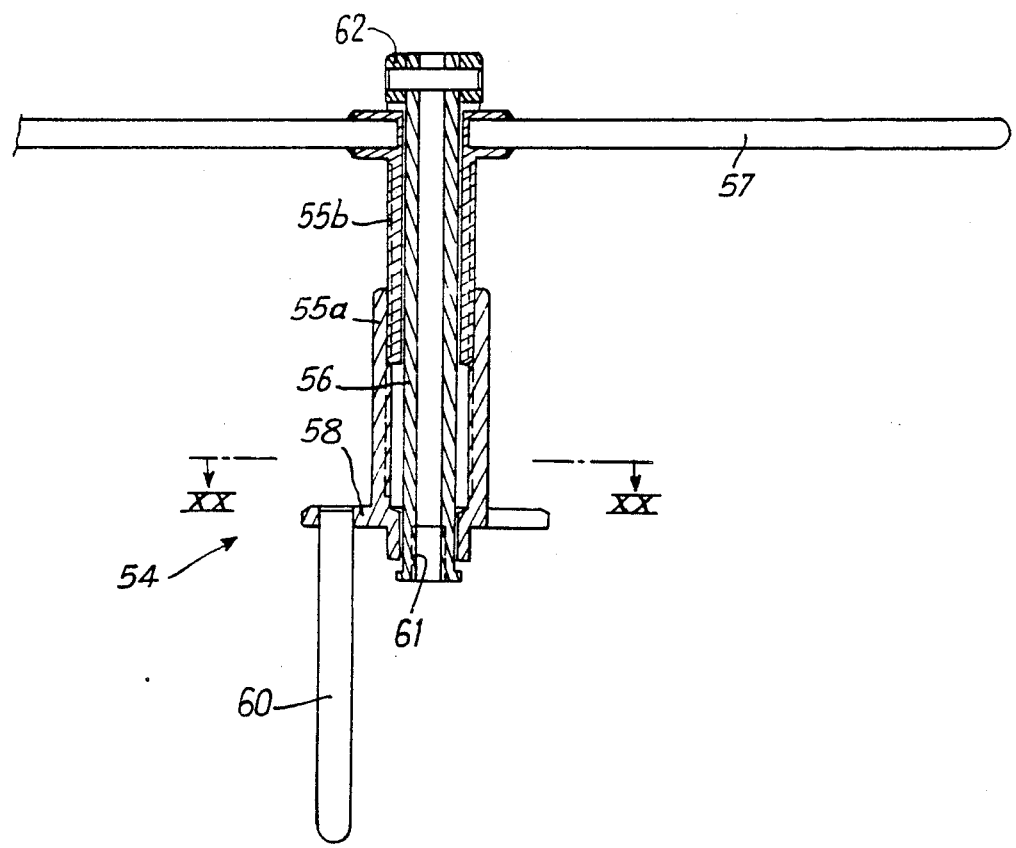
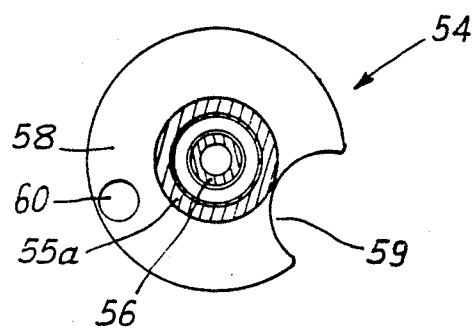

FIXING SYSTEM ENABLING A STRUCTURE TO BE RAPIDLY DOCKED FOR SECURING THEREON AN ELEMENT IN A DETACHABLE WAY

FIELD OF THE INVENTION

The present invention concerns a fixing system, in particular making it possible to rapidly dock a structure whose position to rapidly are not quite precise, to fix to said structure an element linked to said system and to separate said element from said structure in difficult conditions and environments, such as those imposed underwater or in space, in particular outside spaceships.

BACKGROUND OF THE INVENTION

The object of the invention is to simplify as far as possible the manoeuvres to be carried out by an operator and to facilitate docking of the structure, as well as to reduce as far as possible the energy required to lock and unlock said system on the structure, while procuring a significant clamping free from backlash insensitive to temperature variations and not requiring any lubrication. The system according to the invention makes it possible to obtain and ensure a minimum gripping force, with low-amplitude handling on a structure whose dimensions may be subject to large dispersion. Moreover, the system according to the invention makes it possible to prevent the operator from experiencing any sensation of handling forces, since it comrpises free limit stops materializing the various locking stages on the structure.

SUMMARY OF THE INVENTION

Thus, the object of the present invention is to embody a fixing system allowing for the stowage and separation of an element on the structure with a low supply of handling energy and without sensory marking of operations, a known and significant holding force, and a functioning almost insensitive to temperature variations, all the above without requiring lubrication of the parts in contact.

To this effect, according to the invention, the fixing system, making it possible to especially rapidly dock a structure for securing thereon an element in a detachable way, is notable in that it comprises:

pliers able to open spontaneously under the action of a first spring;

a rod able to slide under the action of a second spring so as to close said pliers against the action of said first spring;

a mobile support for said second support;

controllable locking means for locking said sliding rod and said mobile support, able to occupy three positions, namely;

a first position in which said rod and said support are locked and said second spring is stretched;

a second position in which said rod is locked, but said support remains locked; and a third position in which said rod and said support are unlocked;

and means to block at will said locking means and able to also occupy three positions, namely:

a first position in which said blocking means are blocked in their first position;

a second position in which said locking means are able to move from their first to their second position; and a third position in which said locking means are able to move from their second to their third position.

Thus, it can be seen that in the fixing system of the invention, the energy required to obtain the high locking force is stored in said second spring and is freed by activating said locking means. The operator can activate these means simply and easily and the sequencing of operations to be carried out by him is mechanically determined by the respective positions of said blocking means and said locking means. Such positions are defined by mechanical stops and are provided so that the end of one operation mechanically prepares the start of the next one. Thus, in order to use the fixing system of the invention, it is not essential for the operator to be familiar with the internal structure: only a knowledge of the operations to be carried is required. As clearly disclosed by the following, said second and third positions of the locking means respectively correspond to the closing and opening of said pliers.

Preferably, said locking means comprise three locks mobile with respect to one another, one of said locks cooperating with said mobile rod, whereas another one cooperates with said moobile support, the third being used to control the other two, displacement integralization means being provided between said locks.

Said blocking means may be formed by a pin cooperating with said locks, said second and third positions of said blocking means being determined by a stop of said pin against said lock used to control the other two locks.

In this case, it is preferable that said locks be mounted so as to rotate around a common axis and have roughly the shape of a sector of a circle, said pin cooperating with the circular part of said locks. Said pin may have a step-by-step diameter and it may be mounted sliding parallel to the spin axis of said locks.

Said locks, respectively cooperating with said mobile rod and said mobile support, are preferably provided with slots into which said rod and said mobile support are able to penetrate.

In an advantageous embodiment, the system according to the invention comprises a hollow body forming a cylinder and inside which two plates are mounted, said plates forming a piston and respectively integral with said rod and said mobile support, said second spring being mounted between said plates.

Advantageously, a system for marking the position of said blocking means is provided.

Preferably, said locks and said means for rendering integral said locks on displacement are provided so that the closing and opening of said pliers are obtained via inverse displacements of said third control lock.

Following unlocking, in order that the fixing system according to the invention could be reset for subsequent use, the following are provided:

in their third position, said blocking means enable said locking means to move from their third to their second position by deliberate action on said mobile support;

and, in their second position, said blocking means enable said locking means to move from their second to their first position by deliberate action on said second spring.

BRIEF DESCRIPTION OF THE DRAWINGS

The annexed figures and drawings shall fully explain how the invention may be embodied. On these figures, identical references denote similar elements.

FIG. 3 is a partial pull-out front view of the system of FIG. 1.

FIGS. 5, 6 and 7 are respectively front, top and bottom views of the lock cooperating with said mobile rod.

FIGS. 8 and 9 are respectively top and front views of the lock cooperating with the mobile support.

FIG. 10 illustrates the position marking system of the blocking means.

FIGS. 11 and 12 are cutaway views respectively along the lines XI—XI and XII—XII of FIG. 1.

FIG. 13 shows a diagrammatic axial cutaway view of the system according to the invention engaged on the structure.

FIGS. 14 and 15 are respectively sections along the lines XI—XI annd XV—XV of FIG. 1 when the system according to the invention is in the position of FIG. 13.

FIG. 19 shows a cutaway axial view of tooling facilitating resetting of the system according to the invention.

FIG. 20 is a section along the line XX—XX of FIG. 19.

DETAILED DESCRIPTION OF THE PREFERRED EMBODIMENTS

Figure 1:
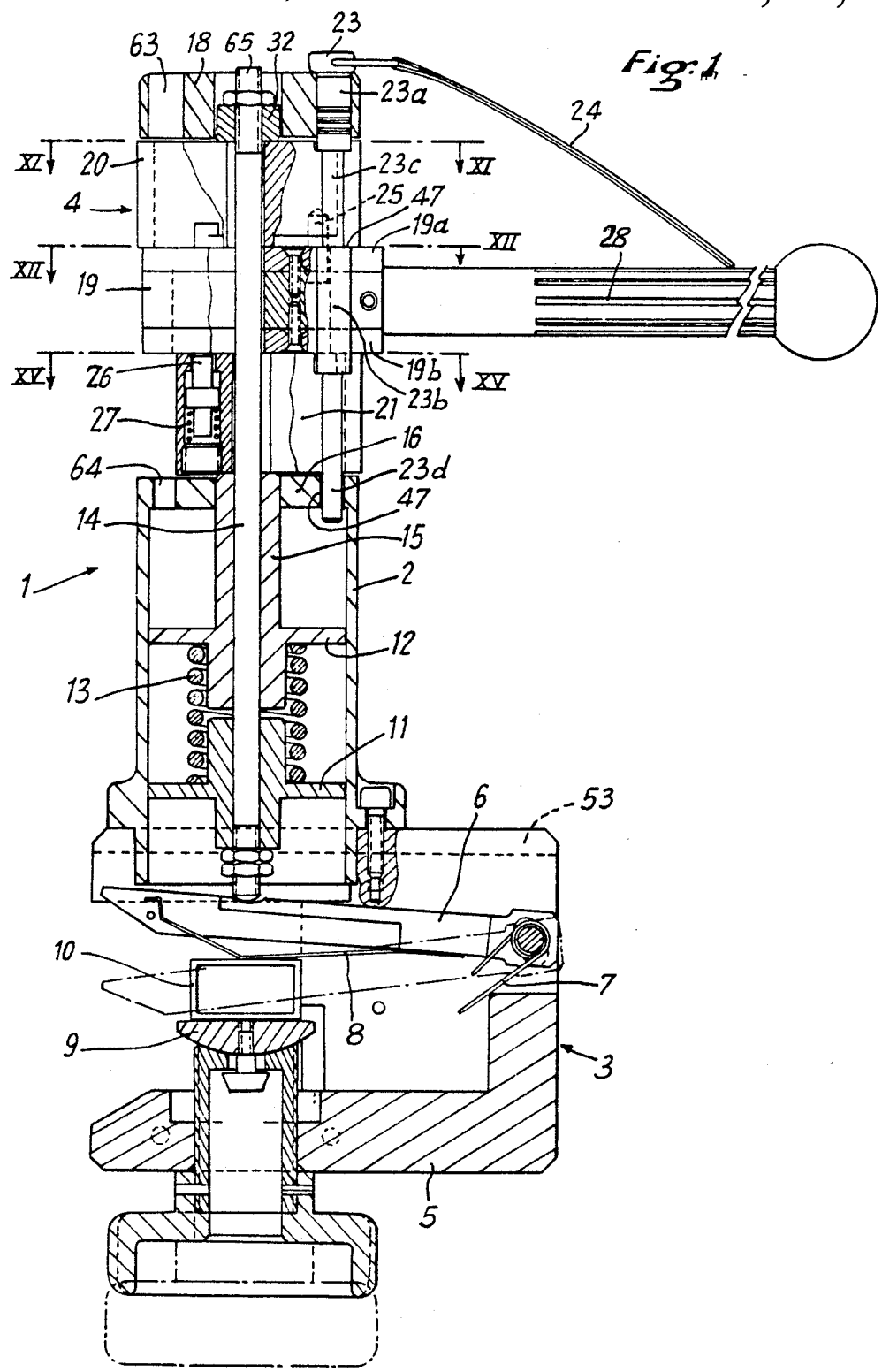
FIG. 1 is an axial cutaway view of the system according to the present invention in the set position.
Figure 2:
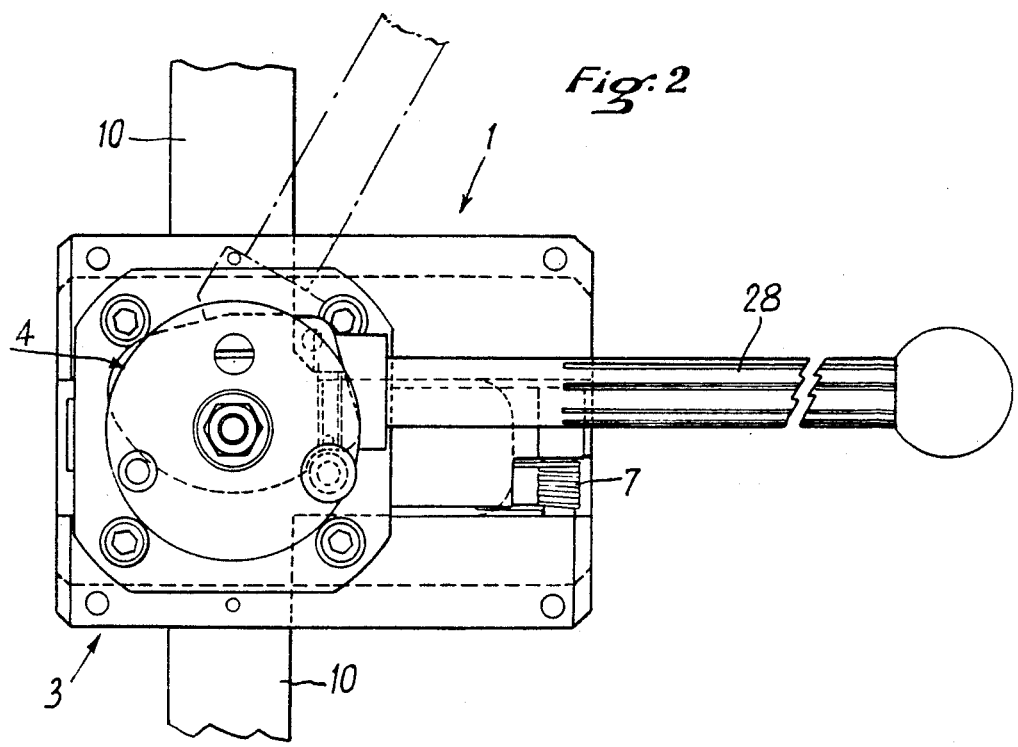
FIG. 2 is a top view corresponding to FIG. 1.

According to the invention, the system 1, as shown on FIGS. 1 to 3, comprises a hollow body 2, rigidly extended at one of its extremities by a pair of the pliers and at its other extremity by a locking system 4.

The pliers 3 comprise a fixed clamping jaw and an articulated clamping jaw 6, elastically pressed opposite said fixed clamping jaw 5 by a spring 7. A spring plate 8 is mounted integral with the articulated clamping jaw 6 opposite the fixed clamping jaw 5. The fixed clamping jaw 5 may comprise a position-adjustable anvil system 9 able to be swivelling-adapted to support an element 10 to which the device is to be secured according to the invention.

Inside the hollow body 2 and acting like pistons, two sliding plates 11 and 12 are provided between which disposed is a spring 13 tending to space them apart. The plate 11 is integral with a rod 14 coaxial to the hollow body 2 and able to slide parallel to its axis. One extremity of said rod 14 is in support on the articulated clamping jaw 6. The plate 12 is integral with a tail coaxial to the rod 14 which encircles. The tail 15 is mounted so as to be able to slide parallel to its axis by transversing the extremity wall 16 of the hollow body 2 opposite the pliers 3.

An arm 17 moved out of center is integral with said extremity wall 16 of the hollow rod 2 and extends the latter opposite the pliers 3. This arm 17 is completed by a plate 18 parallel to the extremity wall 16 of the hollow body 2. The locking system 4 is fitted inside the space provided between the wall 16, the plate 18 and the arm 17 and it comprises three juxtaposed locks 19, 20 and 21, shaped roughly ressembling circular sections, transversed by the sliding rod 14 and rotary mounted around an axis 22 moved out of the center, as well as a pin 23 with a step-by-step diameter, transversing the plate 18 and the extremity wall 16. The pin 23 is integral with a pull cord 24 making it possible to slide and pull cord parallel to said pin. This pin 23 is disposed at the periphery of the rotary locks 19, 20 and 21 and cooperates with the circular section of said periphery (centered on the axis 22) so as to selectively allow or prohibit rotation of said locks, as subsequently explained in detail.

A permanent linking finger 25 renders the locks 19 and 20 integral in rotation in one direction. A retractable linking finger 26, pressed by a spring 27, can render the locks 19 and 21 integral in rotation in the other direction.

The rotary lock 19 is the control lock and is integral with a control handle 28. As shown on FIG. 4, it is constituted by a thick plate roughly having the shape of a sector and is transversed by a hole 29 for the passage of the spin axis 22 and by an elongated and curved slot for the passage of the sliding rod. Its contour comprises a notch 31 for housing the finger 25 integral with the lock 20. Two parts 19a and 19b are provided respectively integral with the lock 19 and with a section identical to the latter.

The rotary lock 20 is intended to control the position of the sliding rod 14 whose head 32 is able to rest on said lock under the action of the spring 13. As shown on FIGS. 5, 6 and 7, the rotary lock 20 is constituted by a thick plate roughly shaped like a sector and is traversed by a hole 33 for the passage of the spin axis and by an arched slot 34 for the passage of the rod 14. The arhed slot 34 comprises a narrow section 34, through which the head 32 is unable to pass, and a widened part 34b through which the head 32 is able to pass. Moreover, the periphery of the lock 20 comprises an upper notch 35, an inner notch 36 and a thickness clearance 37 intended to cooperate with the pin 23.

The rotary lock 21 is intended to control the position of the sliding tail 15 whose extremity is able to rest on said lock under the action of the spring 13. As shown on FIGS. 8 and 9, the rotary lock 21 is constituted by a thick plate roughly shaped like a sector and which is traversed by a hole 38 for the passage of the spin axis 22 and by an arched slot 39 for the passage of the rod 14. The slot 39 comprises a narrow section 39a through which the extremity of the the sliding tail 15 is unable to pass and a widened section 39b through which the extremity of said tail is ablle to pass. The rotary lock 21 further comprises a housing 40 for the retractable finger system 26 and a peripheral notch 41 cooperating with the pin 23. The retractable finger 26 can be made to project outside the rotary lock 21 through an opening 40a opening into the housing 40.

As shown in FIG. 1, the pin 23 comprises two sections 23a and 23b of large diameter and two alternate sections 23c and 23d of small diameter. The section 23a with the large diameter, which traverses the plate 18, comprises three throats, respectively 43.1, 43.2 and 43.3, able to alternately cooperate with a position marking device 44 of the type comprising a ball 45 pressed by a spring 46. The large-diameter part 23b traverses the lock 19, whereas the small-diameter parts 23c and 23d respectively traverse the locks 20 and 21. The extremity of the small-diameter part 23d is engaged in a hole 47 of the extremity wall 16 of the hollow body 2.

On FIGS. 1, 11 and 12, the system according to the invention is represented in the set position. In this set position:

the clamping jaw 6 is distanced from the clamping jaw 5 by the action of the spring 7;

the rod 14 is prevented from sliding under the action of the spring 13 by virtue of the its head resting on the lock 20, as the rod 14 is then in the narrow section 34a of the slot 34;

the tail 15 is prevented from sliding under the action of the spring 13 by virtue of its extremity resting on the lock 21, the rod 14 then being in the narrow section 39a of the slot 39;

the pin is in its position in which the position marking system 44 cooperates with the throat 43.1 (position shown on FIGS. 1 and 10). In this position of the pin 23:

the extremity of the large-diameter part 23a projecting outside the plate 18 cooperates with the notch 35 of the lock 20 to stop the latter rotating around the axis 22;

the extremity of the large-diameter part 23b projects outside the lock 19 cooperates with the notch 41 of the lock 21 to stop the latter rotating around said axis 22.

Moreover, the permanent linking finger 25 also stops the lock 19 from rotating.

Thus, any ill-timed unlocking of the system 1 in the set position is prohibited by the pin 23.

When it is desired to secure the device 1 to the element 10, such as a bar, the latter is engaged between the clamp jaws 5 and 6. The spacing out of said clamping jaws allows for an advance and not quite exact prepositioning of said device with respect to said element 10.

Now, if the pin 23 is pulled out by the pin cord 24 so as to have the ball cooperate with the throat 43.2 and no longer with the throat 43.1, the large-diameter section 23a comes completely out the notch 35 of the lock 20 and the shoulder 47 separating the sections 23b and 23c comes to rest against the clearance 37 of said lock 20 so as to limit the amplitude of sliding of said pin. The section 23b of the pin 23 remains partially housed in the notch 41 of the lock 21. Accordingly, in this position, the lock 20 is no longer linked to the body 2, whereas the lock 21 remains blocked in rotation.

A rotation of the handle 28 in an anti-clockwise direction thus makes it possible to cause the lock 19 and the lock 20 to rotate (linked by the finger 25) as far as bringing the enlarged section 34b of the slot 34 opposite the head 32 of the rod 14. The latter may thus be moved under the action of the spring 13 so as to apply the articulated clamping jaw 6 against the element 10, which is then pressed between said clamping jaws 5 and 6. This situation is represented on FIGS. 14 and 15 which respectively correspond to sections along the lines XI—XI and XV—XV of FIG. 1 after rotation of the handle 28. The end-of-travel position is delimited by the cooperation of the notch 36 of the lock 20 with the large-diameter section 23b of the pin 23.

Figure 4:
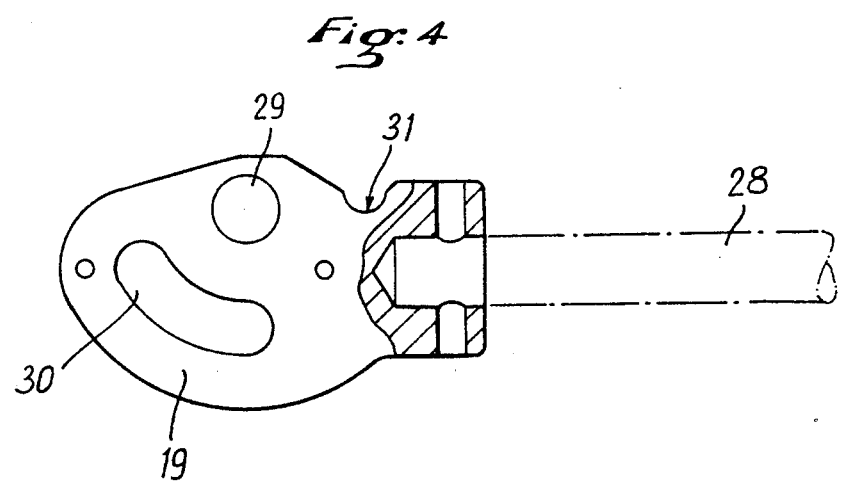
FIG. 4 is a plane view of the control lock of the locking means.

The finger 26, which up until then was pushed back into the lock 21 by the corresponding face of the lock 19, is freed and, under the action of the spring 27, is placed against the lock 19 (FIG. 4).

If a new traction is now exerted on the pin 23 so as to bring the throat 42.3 opposite the ball 45, the large-diameter section 23b fully comes out of the notch 41 of the lock 21 so that the latter can rotate around the axis 22. The end-of-travel of the pin 23 is then effected by the stop of the shoulder 47 against the bottom 48 of the notch 36 of the lock 20 (see FIG. 5).

Accordingly, if the handle 28 is brought back to its initial position shown by FIGS. 1, 11 and 12, the lock 19 causes the lock 21 to rotate by virtue of the linking embodied by the finger 26. This rotation of the lock brings the enlarged portion 39b of the slot 39 opposite the tail 15 so that the latter, under the action of the spring 13, can penetrate into said lock 21. The spring 13 thus recoils and the element 10 may be freed from the pliers 3. This situation is illustrated by the diagrammatic FIG. 16, as well as by FIG. 17, which corresponds to a section along the line XV—XV of FIG. 1, after the to-and-fro movement of the handle 28.

In this position, the handle 28 is free to rotate around the axis 22 in an anti-clockwise direction. Thus, it may be advantageous to provide between the locks 19 and 20 a linking device with a retractable finger of the type of the one bearing the references 26 and 27. Such a linking device is not represented. Only its housing 49 is shown on FIGS. 5 and 6.

Figure 18:
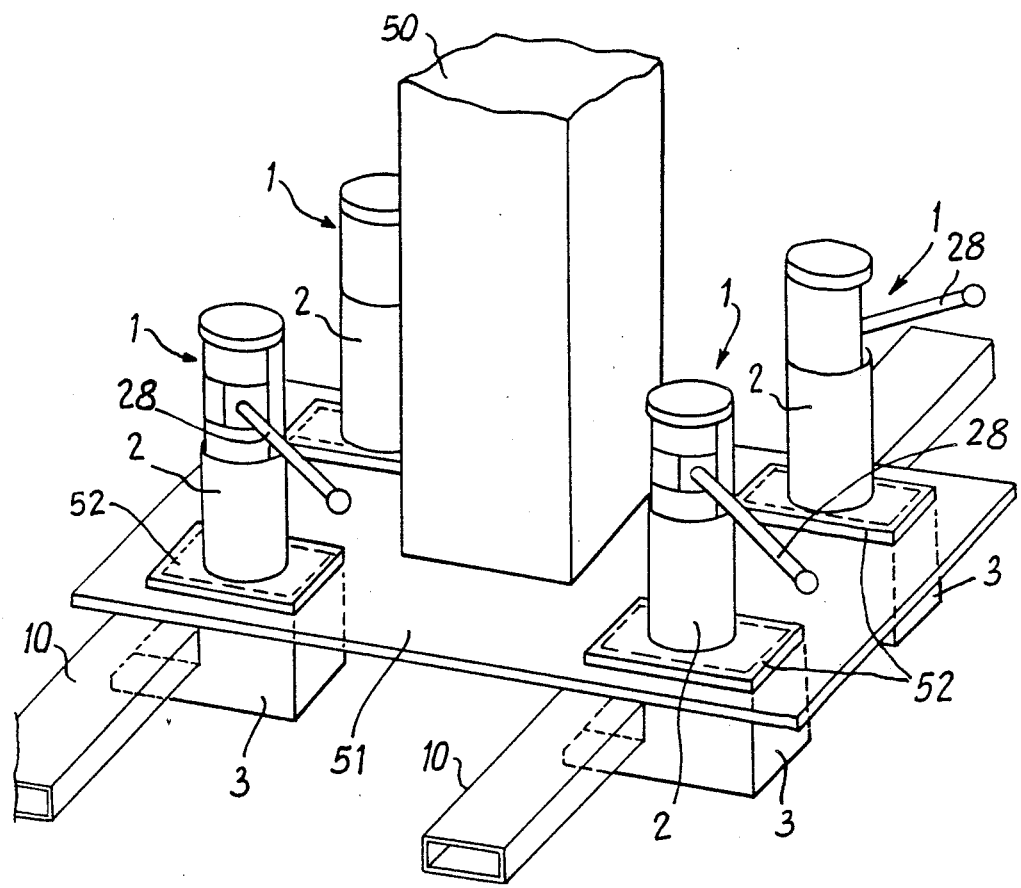
FIG. 18 illustrates the use of the system according to the invention for securing an item of equipment to the structure.

FIG. 18 shows an item of equipment 50 required to be secured to two parallel bars integral with the structure of a spaceship. The equipment 50 is borne by a plate 51 pierced with openings 52 passed through by fixing devices 1. These fixing devices are applied against the plate 51 at the periphery of the openings by means of shoulders 53 provided on the body 2-3 of said devices 1. It can be seen from the foregoing that the equipment 50 may be easily rendered integral with the bars 10 by means of the systems 1.

Figure 16:
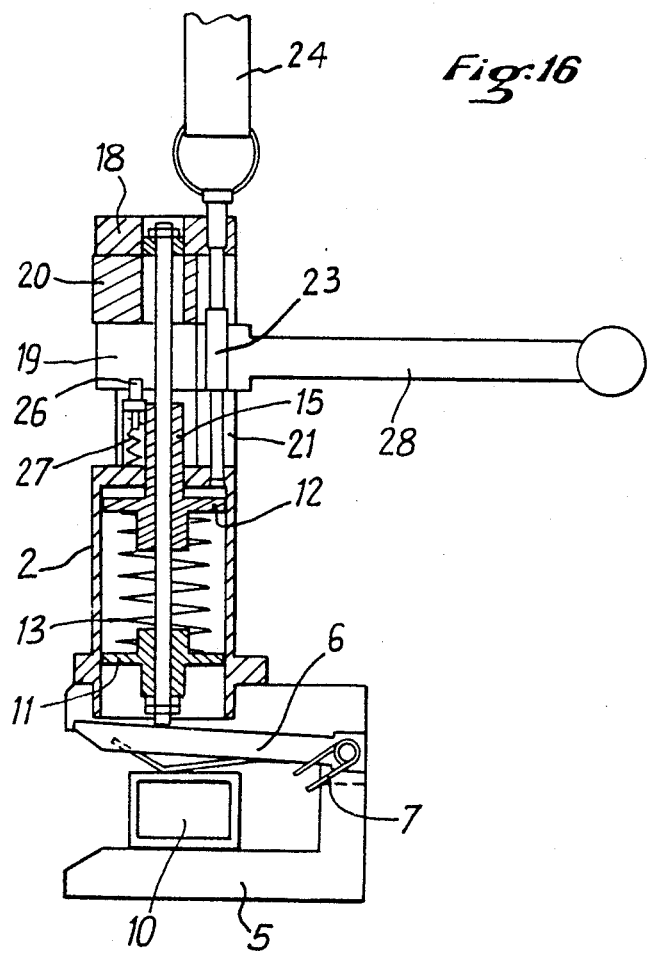
FIG. 16 shows a diagrammatic axial cutaway view of the system of the invention in the structure unlocking position.
Figure 17:
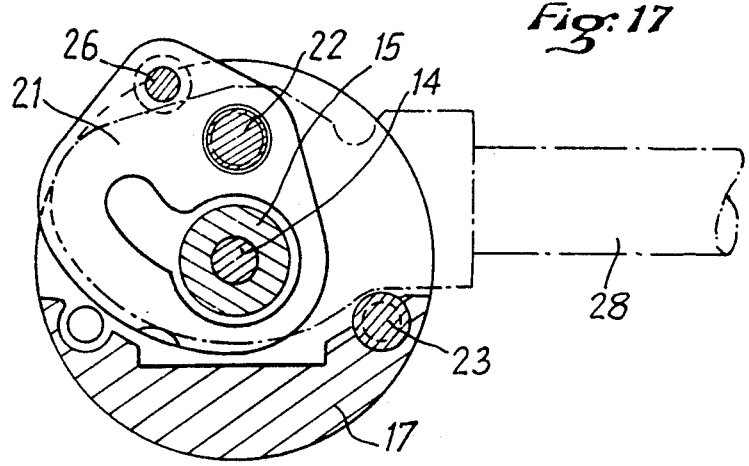
FIG. 17 is a section along the line XV—XV of FIG. 1 when the system of the invention is in the position of FIG. 16.

When the system 1 according to the invention is in the unlocked state illustrated by FIGS. 16 and 17, it is necessary to bring it to the stretched state illustrated by FIGS. 1, 11 and 12 before being used again. To this effect, it is possible to advantageously use the tool 54 shown by FIGS. 19 and 20.

This tooling 54 mainly comprises a lifting jack 55a, 55b and a bush 56, loosely enclosed in said jack, parallel to its longitudinal axis. One of the sections 55b of the lifting jack is integral with a control handle 57, wherein the other (55a) of said sections of the jack is provided with a support face 58 equipped with a scalloping 59. A rod 60 is integral with said support face 58. The bush 56 is provided at one of its extremities with a female thread 61 and, at its other extremity, a control head 62.

The tooling 54 is used as follows.

The rod 60 of said tooling is made to penetrate into two opposite holes 63 and 64 respectively made in the plate 18 and into the extremity face 16 so that the free extremity of said rod may come into contact with the plate 12 and be used to push back said plate until the tail 15 fully comes out of the enlarged section 39b of the slot traversing the lock 21. The latter may then be rotated anti-clockwise after having retracted the finger 26 by pressing it against the action of the spring 27. When the lock 21 is brought back to its initial position shown by FIG. 1, the pin 23 is pushed back so that the ball 45 passes from the throat 43.3 to the throat 43.2. The lock 21 is then unlocked in this initial position.

Once the support face 58 of the tooling 54 has been disposed on said plate 18 so that the bush 56 is extended from the rod 14 (the head of the pin 23 then being in the scalloping 59), it is possible to make the control head 62 rotate so as to screw the female thread 61 of the bush onto the threaded extremity 65 of the rod 14. Then the handle 57 is operated so that the lifting jack 55a, 55b pulls on the rod 14 by taking support between the plate 18 and the control head 62.

When the head 32 is freed from the lock 20, it is possible to bring the lock back to its initial position by rotating it anti-clockwise. Once this initial position is reached, the pin 23 is pushed back so that the ball 45 passes from the throat 43.2 to the throat 43.1. At this moment, the system according to the invention is once again in its initial state, the spring 13 being stretched with the locks 19, 20, 21 blocked and the pliers 3 open.

What is claimed is:

1. Fixing system enabling in particular to rapidly dock a structure for securing thereon an element in a detachable way, wherein the system comprises:
   pliers able to open spontaneously under the action of a first spring;
   a mobile rod able to slide under the action of a second spring so as to close said pliers against the action of said first spring;
   a mobile support for said second spring;
   controllable locking means to lock said sliding rod and said mobile support and able to occupy three positions, namely;
     a first position in which said rod and said support are locked and said second spring is compressed;
     a second position in which said rod is unlocked, but said support remains locked; and
     a third position in which said rod and said support are unlocked;
   and means with deliberate control to block said locking means and also able to occupy three positions, namely:
     a first position in which said locking means are blocked in their first position;
     a second position in which said locking means can pass from their first to their second position; and
     a third position in which said locking means can pass from their second to their third position.

2. System according to claim 1, wherein said locking means comprise three control locks being mobile with respect to one another, one of said locks cooperating with said mobile rod, whereas another lock cooperates with said mobile support and the third lock is used to control the other two locks, displacement integralization means being provided between said locks.

3. System according to claim 2, wherein said blocking means are formed by a pin cooperating with said locks, said second and third positions of said blocking means being determined by a stop of said pin against said lock used to control the other two locks.

4. System according to claim 3, wherein said locks are rotary mounted around a common spin axis and having the shape of roughly at least a sector of a circle, said pin cooperating with the circular section of said locks.

5. System according to claim 4, wherein said pin has a step-by-step diameter and is mounted sliding parallel to the spin axis of said locks.

6. System according to claim 2, wherein said locks respectively cooperating with said mobile rod and said mobile support are equipped with slots in which said rod is able to penetrate.

7. System according to claim 1, which further comprises a hollow body forming a cylinder and inside which two plates are mounted forming pistons and are respectively integral with said rod and said mobile support, said second spring being mounted between said plates.

8. System according to claim 1, which further comprises a system to localize the position of said blocking means.

9. System according to claim 2, wherein said locks and said means for rendering integral said locks on displacement are provided so that the closing and opening of said pliers are obtained by inverted displacement of said third control lock.

10. System according to claim 1, wherein in their third position, said blocking means allow said locking means to pass from their third to their second position by deliberate action on said support, and wherein in their second position, said blocking means allow said locking means to pass from their second to their first position by deliberate action on said second spring.

* * * * *